(12) United States Patent
Mitzkat

(10) Patent No.: US 8,955,669 B2
(45) Date of Patent: Feb. 17, 2015

(54) VIBRATING HELICOIDAL TRANSPORT DEVICE

(71) Applicant: Martin Mitzkat, Cliousclat (FR)

(72) Inventor: Martin Mitzkat, Cliousclat (FR)

(73) Assignee: Technical Alliance, Cliousclat (FR)

( * ) Notice: Subject to any disclaimer, the term of this patent is extended or adjusted under 35 U.S.C. 154(b) by 0 days.

(21) Appl. No.: 13/989,530

(22) PCT Filed: Oct. 26, 2012

(86) PCT No.: PCT/FR2012/052469
§ 371 (c)(1),
(2) Date: May 24, 2013

(87) PCT Pub. No.: WO2013/076397
PCT Pub. Date: May 30, 2013

(65) Prior Publication Data
US 2014/0251763 A1    Sep. 11, 2014

(30) Foreign Application Priority Data

Nov. 24, 2011  (FR) ..................................... 11 60726

(51) Int. Cl.
*B65G 27/02* (2006.01)
*B65G 27/16* (2006.01)
*B01J 8/16* (2006.01)
*B06B 1/16* (2006.01)

(52) U.S. Cl.
CPC . *B65G 27/16* (2013.01); *B01J 8/16* (2013.01); *B65G 27/02* (2013.01); *B06B 1/16* (2013.01)

USPC ........................................................ 198/756

(58) Field of Classification Search
CPC ...................................................... B65G 27/02
USPC ....................... 198/756, 752.1, 763, 766, 778
See application file for complete search history.

(56) References Cited

U.S. PATENT DOCUMENTS

| 2,805,841 A | * | 9/1957 | Kyle | 198/756 |
| 2,847,767 A | * | 8/1958 | Carrier, Jr. | 198/756 |
| 2,918,070 A | * | 12/1959 | Carrier, Jr. | 198/756 |
| 3,053,380 A |   | 9/1962 | Spurlin |  |
| 3,789,977 A | * | 2/1974 | Musschoot | 198/756 |

(Continued)

FOREIGN PATENT DOCUMENTS

| FR | 2634187 A1 | 1/1990 |
| FR | 2680637 A1 | 3/1993 |

(Continued)

OTHER PUBLICATIONS

International Search Report mailed Jan. 14, 2013, corresponding to PCT/FR2012/052469.

*Primary Examiner* — James R Bidwell
(74) *Attorney, Agent, or Firm* — Ladas & Parry LLP

(57) ABSTRACT

The present invention relates to a transport device having a transport module including a helicoidal conduit actuated in vibration by a vibration module having a support with a rigid connecting piece supporting a plurality of n pairs of vibrating motors. The rigid connecting piece is a mecanowelded structure, in a recessed part, having a plurality of at least two n vertical structural elements and a plurality of at least two n horizontal structural elements.

15 Claims, 7 Drawing Sheets

(56) References Cited

U.S. PATENT DOCUMENTS

| | | | |
|---|---|---|---|
| 4,245,737 A * | 1/1981 | Pellerin et al. | 198/756 |
| 4,274,953 A | 6/1981 | Jackson | |
| 4,775,284 A * | 10/1988 | Musschoot | 198/756 |
| 5,024,320 A * | 6/1991 | Musschoot | 198/756 |
| 7,377,728 B2 * | 5/2008 | Markowski et al. | 198/778 |
| 8,733,539 B2 * | 5/2014 | Choy et al. | 198/756 |

FOREIGN PATENT DOCUMENTS

| | | |
|---|---|---|
| FR | 2683896 A1 | 5/1993 |
| FR | 2701861 A1 | 9/1994 |
| FR | 2712965 A1 | 6/1995 |
| FR | 2788260 A1 | 7/2000 |
| FR | 2788336 A1 | 7/2000 |
| WO | 2013076397 A1 | 5/2013 |

\* cited by examiner

VIBRATING HELICOIDAL TRANSPORT DEVICE

This application is a 371 of PCT/FR2012/052469, filed on Oct. 26, 2012, which claims priority to the French patent application number 11 60726, filed on Nov. 24, 2011, which is incorporated herein by reference.

BACKGROUND OF THE INVENTION

The present invention relates to a transport device by vibration of product to be treated, especially a product to be treated thermally, along a helicoidal ramp or chute, especially in the form of a helicoidal conduit or tubular serpent, fixed and rolled around or inside a central column, capable of being vibrated by a vibration module to which it is attached.

More particularly, the present invention relates to such a device comprising a novel vibration module, capable of being vibrated by vibrating motors, preferably of unbalance motor type.

Helicoidal vibrating elevator apparatus of this type, also called shaking elevators, have been described in FR 2 680 637, FR 2 683 896, FR 2 634 187, FR 2 701 861, FR 2 788 260, FR 2 788 336 and FR 2 712 965.

In these devices, vibration of the central column causes vibration of the helicoidal conduit, due to the fact that the central column rigidifies and supports said helicoidal conduit. Said helicoidal conduit comprises at least two helical pitches. Vibration of the ramp or helicoidal conduit causes vibration of a particular circulating product to be treated by advancing by jumps along the ramp or helicoidal conduit due to said vibrations. In general, said central column is placed vertically. This vibration causes height displacement of the particles of product introduced to said ramp or helicoidal conduit, from the lower end of the ramp or helicoidal conduit to its upper end. The vibrations of the column therefore advance the bulk product contained in the ramp or helicoidal tube.

These equipments can be used to continuously heat and/or cool pulverulent or particulate products by direct contact with a heat-transfer fluid, circulating outside or inside said helicoidal transport conduit, or by contact with the wall of said helicoidal conduit heated by Joule effect by directing electric current into said wall. The heat is transferred by a complex combination of conduction, convection and radiation to the product circulating inside said helicoidal conduit. In this way, the equipment enables continuous thermal treatment of divided solids at temperatures reaching 700 to 1,000° C., with flow rates reaching 15 t/h. The space around the product inside the helicoidal conduit can be occupied by inert gas, a so-called heat-transfer fluid, reactive gas and/or drying air. The equipment can also be used in applications under continuous vacuum or pressure inside said helicoidal transport conduit.

Vibrating elevators of this type are sold by the company REVTECH (France) and by other companies such as the company SINEX (France).

As it is known, several criteria determine the dimensions of said helicoidal conduit of the equipment, specifically the volumetric flow, the apparent density of the product and its heat capacity, characteristics of the processing or inerting gas, dwell time, preferred temperature profile and, finally, preferred discharge height.

The upward angle of the ramp or helicoidal conduit, that is, the inclination of the spire relative to the horizontal, is conventionally between 1 and 10°, preferably between 1 and 5°. The transversal cross-section of said helicoidal conduit is preferably substantially circular.

The displacement of product particles inside the helicoidal conduit occurs by small jumps, with the transport speed of said product capable of reaching 30 cm/s for dwell times of the product capable of lasting up to one hour. The diameter of the helicoidal conduit will be a function of the consistency and/or of the flow of the product to be treated, the diameters being from 50 to 300 mm. The processing capacity, in terms of flow rate in t/h, product to be treated depends on the dimensions and the weight of the equipment. The limiting factor is constituted by the capacity of said vibration module to make the equipment vibrate, given its total weight.

Vibration of the central column and of the helicoidal conduit results from vibration of a vibration module comprising a vibration transfer bracket fixed at the apex or at the base of a support base, on the lateral wall to which are fixed the vibrating motors such that said base and said vibration transfer bracket are capable of being vibrated by said vibrating motors which are fixed to said base.

A preferable example of vibrating motors is unbalance ("off balance") motors. Unbalance vibrating motors in general comprise a closed cylindrical hood, enclosing an electrical device capable of driving in rotation an eccentric internal mass whereof the force centrifugal and the moment (or working torque) determine the resulting amplitude of the vibration of the base frame and its vibration transfer bracket. The eccentric internal mass is driven in rotation by an electrical device. Said hood is enclosed by a flange or fitted with a fastening foot for it to be fixed on a bracket, table or flange, which bracket, table or flange can cooperate in rotation with a counter-bracket or counter-table or counter-flange solid with the base frame so as to allow variable inclination of said motor relative to the axis XX' of said base.

In the prior art cited hereinabove, the vibration module comprises a base frame comprising a vibrating table or vibrating platform serving as support to the central column, around which or in which said helicoidal conduit extends, the base frame being capable of being actuated in vibration by two unbalance motors placed against and around said base frame, said two unbalance motors being arranged symmetrically with the same inclination α relative to the vertical axis XX' of said base frame, corresponding to the vertical axis XX' of said central column which it supports.

Arranged and fixed accordingly on said base frame, which comprises a rigid transversal connection structure of both diametrically opposed unbalance motors, the simultaneous actuation of the two unbalance motors in the opposite direction of rotation produces helicoidal vibrations of said base frame and causes vibrations of the upper platform and therefore of the central column which it supports, rigidly attached to each other.

More particularly, vibration is obtained by the combination of two translation movements in said axial direction XX' and rotation movements relative to said axis XX'. These successive combined forward and back translation and rotation movements, of relatively reduced amplitude, constitute successions of screwing by simultaneous actuation of the motors and unscrewing by simultaneous stopping of the motors or spinning movements. As a function of the inclination α of the axis YY' of the motors relative to the horizontal, the component of translation movement (α=90°) or conversely rotation movement (α=0°) is preferred. In practice, the amplitude of these movements in translation or rotation corresponds to a pitch distance of over 3 cm, more particularly, no more than 2 cm, in the direction XX' for translation or in length of an arc of a circle for rotation movement. Also, the amplitude and speed of displacements by jumps of product particles inside the helicoidal conduit also depend on the nature of vibratory movement. In practice, the inclination of the two axes YY' of the two unbalance motors is adjusted by an angle α from 10 to 60°, more particularly from 30 to 45°, relative to the horizontal (P).

To achieve out-and-back translation/rotation movements and create this screwing unscrewing vibration, the two motors have to comprise an unbalance turning in the opposite direction and at same speed. The rigid transversal linking beam of the two motors ensures autosynchronisation of the motors, that is, uniformity of their respective intensity and speed.

When the two motors are arranged diametrically opposed and symmetrically inclined, as mentioned hereinabove, with a transversal linking structure between the two rigid motors, autosynchronisation of the two motors is realised stably by way of mutual cancelling of the two transversal forces developed by the two motors respectively on the rigid transversal linking beam of the two motors, either in simultaneous compression in the opposite direction, or in simultaneous extension in the opposite direction.

The transversal linking beam of the two motors therefore ensures that compression and extension forces generated by the centrifugal or symmetrical centripetal forces inside said motors are absorbed, with the result that all movements are converted to vibratory translation/rotation movement. The transversal linking beam of the two unbalance motors also ensures that the two motors are well positioned symmetrically relative to the same horizontal plane so as to prevent any torsion torque.

Motors of this type are especially sold by the companies FRIEDRICH SCHWINGTECHNIK GmbH (Germany), VISAM (Italy) a subsidiary of WAMGROUP, OLI (France) and ITALVIBRAS (Italy). These motors, of greater capacity, have a centrifugal force of 180,000 N and a working moment of 6,000 kg·cm. A motor of this type, having a frequency of 740 rpm (12.5 Hz), comprises 8 poles (4 pairs of poles) and is sold by the company FRIEDRICH SCHWINGTECHNIK GmbH under reference F6000-8-10.0.

Two unbalance motors of maximal power, such as described hereinabove, produce acceleration of up to 4 g of a vibrating elevator device including the vibration module of a weight of 9,000 kg. This acceleration of 4 g can reach a particle displacement speed of up to 0.4 m/s in a so-called helicoidal conduit of 8" in diameter and enclosed around a column of 2.2 m in diameter on 15 turns, constituting a conduit height of 8 m for processing a product rate of 10 t/h (tons/hour).

The aim of the present invention is to be able to increase the weight of the equipment, and therefore the dimension of the column and of the helicoidal conduit, and therefore increase the rate of product to be treated up to at least 20 t/h, and the displacement speed of particles over 0.4 m/s, in practice requiring equipment of at least 15 t for, for example, a pipe of 10 to 18" in diameter (around 27 to 49 cm) extending over at least 17 turns, enclosed around a column of at least 3 m in diameter, constituting a height of helicoidal conduit of at least 17 m.

In practice, in a vibrating elevator device according to the invention the aim is to maximise the amplitude values of the vibration movement and, especially, reduce the vibration frequency, in practice not more than 15 to 20 Hz, more particularly of the order of 10 Hz, for movement amplitudes of 2 to 3 cm.

With commercially available unbalance motors of maximal power, it is not possible to get vibrations of 10 to 20 Hz in frequency with acceleration of 2 to 5 g and amplitudes of 10 to 30 mm, of a total mass of vibrating elevator device of 15,000 kg required to obtain product processing rates of 20 t/h, as mentioned hereinabove.

The aim of the present invention is therefore to provide a vibration module for improved helicoidal elevator for driving in vibration of greater mass and greater dimension to provide a product processing rate greater than with vibration systems of the state of the art involving only two unbalance motors.

According to the present invention a novel vibration module comprising a plurality of pairs of vibrating motors is provided.

More particularly, according to the present invention a vibrating transport device is provided, comprising:
  a transport module comprising a first cylindrical support extending in a vertical longitudinal direction XX', called first axis, said first cylindrical support supporting a helicoidal chute or conduit of the same first axis XX', and
  a vibration module comprising a second support of the same first axis XX', comprising two upper and lower tables (or brackets), whereof one vibration transfer table, at least, fixed to a longitudinal end of said first cylindrical support so as to enable it to transfer said vibrations to the latter, said second support supporting, at least, n pairs of vibrating motors distributed uniformly over the lateral periphery of said second support according to the same horizontal plane P, preferably a median horizontal plane P, more preferably on a peripheral lateral wall 6 of said second support, each motor extending in a longitudinal direction (YiYi' with i=1 to 2n) according to the same inclination α relative to the horizontal, the two motors of each pair being arranged diametrically opposed at the same distance from said vertical axis XX', said second support comprising a rigid connecting piece between the different vibrating motors and said vibration transfer table such that simultaneous vibration actuation of the assembly of said motors is capable of engendering helicoidal vibration of the first support.

FR 2 223 649 describes an elevator transporter with helicoidal ramp (FIG. 21) comprising only two unbalance motors diametrically opposed and having the same inclination. Also, in the case of a vibrating oven with annular ramp (FIGS. 1 and 4), two pairs of vibrating motors arranged in a cross are utilised, the two pairs of motors being inclined with inverse inclinations relative to each other and being intended to be actuated separately due to the fact that a first pair of motors acts serves to transport the product in a clockwise direction inside the annular gutter, whereas the second pair of motors serves to transport the product to be treated in the opposite direction (cf. page 12, lines 17 to 37).

EP 965805 describes a drying device in a container in the form of a barrel, capable of being vibrated by two pairs of vibrating motors arranged in a cross, all inclined in the same direction according to the same inclination and actuated simultaneously. However, due to the fact of the relatively reduced weight of this vibrating oven relative to a high-capacity helicoidal elevator, the two pairs of motors are connected by a connector formed by two connecting tubes arranged in a cross. This rigid connecting tube piece arranged in a cross would not mechanically resist rupturing of the assembly of welded tubes in the case of high-power vibrations required to vibrate a helicoidal elevator of substantial weight and dimension, in keeping with the aim of the present invention.

U.S. Pat. No. 3,053,380 describes a transport device vibrating of the type described hereinabove, which, as in FIG. 8, provides using two pairs of unbalance motors, inclined in the same direction. However, the motors are fixed simply against the walls diametrically opposite a cubic base, without a transversal connector between the walls. As shown in FIG. 9, the portion of tube of square cross-section supporting the motors can be arranged coaxially to the exterior of the helicoidal elevator device and at an intermediate height between the upper and respectively lower ends. There is no direct and rigid link between the two diametrically opposed motors, which risks causing cracking. Also, there is the risk that autosynchronisation of the set of motors will not start due to the flexibility of the link.

SUMMARY OF THE INVENTION

According to the present invention, a vibration module is provided, comprising a rigid connecting piece, capable of transferring the vibrations generated by the simultaneous actuation of a plurality of pairs of vibrating motors to vibrate a high-capacity and mechanically resistant transport module, without risk of breaking of the assembly of the vibration module and, in particular, said rigid connecting piece, when the latter is set in vibration to actuate by shaking in a helicoidal elevator of considerable weight and size.

More precisely, the present invention provides a helicoidal vibrating transport device, defined hereinabove, characterised in that said rigid connecting piece is a mecano-welded structure, partly hollowed out, of the same vertical axis XX' comprising at least one assembly by welding of at least:

a) a plurality of at least 2n structural elements extending in a vertical direction, so-called vertical structural elements, comprising diametrically opposed external edges in pairs, said vertical structural elements comprising flat parts extending in different radial directions $Z_jZ_j'$, with j=1 to n, each said vertical structural element having transversal cross-sections open in horizontal cross-sections and vertical cross-sections perpendicular to said radial direction, and b) a plurality of at least 2n structural elements extending in a horizontal direction so-called horizontal structural elements comprising diametrically opposed external peripheral edges in pairs, said horizontal structural elements comprising flat parts being located at different levels in the vertical direction XX', each said horizontal structural element having transversal cross-sections open in vertical cross-sections, and c) each said vertical structural element being welded to at least one said horizontal structural element and each said horizontal structural element being welded to at least one said vertical structural element, at least 2(n−1) of said diametrically opposed vertical structural elements in pairs comprising internal edges welded to the same vertical connecting element, and at least one part of said horizontal structural elements comprising internal edges welded to the same vertical axial connecting element, and d) each said vibrating motor being fixed, preferably by means of a first mounting bracket or first flange, either to at least one said peripheral external edge of at least one said vertical structural element and to at least one said peripheral external edge of at least one horizontal structural element, or, preferably, to a part of a lateral wall welded to at least one said peripheral external edge of at least one said vertical structural element and welded to at least one said peripheral external edge of at least one horizontal structural element.

It is understood that at least one part of said vertical structural elements and said horizontal structural elements extends in horizontal cross-section with continuity of material from said axial connecting element and their external peripheral edge.

This type of assembly is advantageous in that welding of the different constituent elements is easy to carry out due to the form of their transversal cross-sections, but above all in that it provides a rigid connecting piece, at the same time a moment of high inertia and low weight, such that the essence of the power of the vibrating motors is transferred for vibration of said first support, the vibration of the second support absorbing only a relatively reduced quantity.

Here:
  "median plane" means a plane passing through the halflength of said motor in its longitudinal direction;
  "helicoidal vibration" or "vibration according to movements helicoidal" means alternate helicoidal movements combining displacements in translation and rotation on itself, which are successive, relative to the said first vertical axis XX', going out when the motors are actuated and returning when the motors are in simultaneous stoppage;
  "simultaneous actuation in vibration of the assembly of said motors" means a succession of simultaneous actuations and simultaneous stoppages of said motors;
  "transversal cross-section" means a cross-section in the direction perpendicular to the longitudinal direction, either vertical for the first profiles horizontal, or horizontal for the reinforcing elements;
  "internal edge" means the edge closest to the vertical axis XX';
  "open cross-section" means a form not delimiting an internal space entirely closed by the contour of the cross-section, as opposed to a closed cross-section such as the cross-section of a tube. In this way, known profiles of open cross-section are beams whereof the cross-section has a shape of an I, T, U or H;
  "diametrically opposite" means located at the level of said peripheral wall, at the same distance from said vertical axis XX' and in two directions aligned opposite at 180° relative to the said vertical axis XX', the horizontal cross-section of said peripheral wall entering a circle of said axis XX', said horizontal cross-section of the peripheral wall especially forming a regular polygon;
  "radial direction" means a direction perpendicular to the vertical axial direction XX' and passing through said axial direction XX', and
  i, j, p and n are whole numbers.

Preferably, all said vertical structural elements comprise internal edges welded to the same vertical axial connecting element.

More particularly, said rigid connecting piece comprises:
  said entirely flat vertical structural elements, and
  said entirely flat horizontal structural elements.

It is understood that these entirely flat structural elements constitute plates made of metal or steel.

In a first variant embodiment said axial connecting element is a tubular vertical connecting element of the same vertical axis XX', preferably all said vertical structural elements being welded to the same said tubular vertical connecting element.

In a second variant embodiment, two said vertical structural elements having diametrically opposed peripheral edges are constituted by the same piece having a flat vertical central part extending continuously and symmetrically relative to the said central vertical axis XX' and forming a said vertical axial connecting element, and the other vertical structural elements have internal edges welded onto a face of said flat central part of said axial connecting element.

More particularly, in the first variant embodiment said rigid connecting piece comprises:

said entirely flat vertical structural elements extending vertically between said upper and lower tables and radially from substantially said vertical axis XX' and the periphery of said module, and said entirely flat horizontal structural elements comprising two radially extending lateral edges forming said internal edges welded to said vertical structural elements, each said flat vertical structural element being welded to a plurality of said flat horizontal structural elements at different levels p in the vertical direction.

It is understood that each horizontal structural element occupies an angular sector between two vertical structural elements.

In both embodiments, at each of the p levels in the vertical direction 2n said flat horizontal structural elements are located at the same level in the vertical direction.

More particularly, in both embodiments said rigid connecting piece comprises said horizontal structural elements at p levels in the vertical direction comprising flat parts having perforations aligned vertically in which is placed an inspection ladder or is capable of allowing an inspection ladder to be placed therein, with preferably p=2 to 5.

More particularly still, in the different embodiments said rigid connecting piece comprises:

vertical reinforcing elements constituted preferably by profiles with open transversal cross-sections extending between two said upper and lower tables or between two flat parts of two said horizontal structural elements, and/or horizontal reinforcing elements whereof a radial internal edge is welded to a flat part of a said vertical structural element from its peripheral external edge, preferably two said horizontal reinforcing elements being welded onto the two opposite faces of said flat part.

Said horizontal reinforcing elements constitute complementary lateral horizontal ailerons for fixing of the lateral wall opposite the brackets of fixation of said motors.

More particularly still, said pairs of motors number n=2 to 6, and the different radial directions ZjZj' of the different pairs of motors in said median plane are spaced angularly by the same angle of 90° (n=2), 60° (n=3), 45° (n=4), 36° (n=5), 30° (n=6), preferably n=2.

More particularly still, said vibrating motors are unbalance motors actuatable electrically in vibration, and said motors comprise cylindrical hoods extending in longitudinal axial directions YY' according to the same inclination α relative to the said median plane by an angle α of inclination of the same value and in the same direction of rotation in two of the planes parallel to the said first axis XX' arranged at the same distance from said first axis, each said motor comprising an eccentric internal mass capable of turning in internal rotation about the longitudinal axial axis YY' of said motor, each said motor being fixed at the level of its hood to said lateral wall by means of a first mounting plate or first flange solid with said lateral wall or of a second plate or second flange, said first mounting plate or first flange being fixed to a flange or collar solid with said hood, said first plate or first flange being fixed against said lateral wall or said second plate or second flange, said first plate or first flange capable of adopting several fastening positions n by rotation of said first plate or first flange about the same radial axis so as to enable said variable inclination α of said axis longitudinal of said motor.

More particularly, said first plate or first flange comprises orifices, each extending over a portion of an arc of a circle, preferably of the same length, the different orifices being spaced along the same circle, preferably spaced uniformly, with screws or fastening fingers connected to said lateral wall or said second plate or second flange passing through said orifices, the position of said first plate or first flange being adjustable in rotation relative to said lateral wall or said second plate or second flange according to any position along each orifice and by offset of the orifices passing through said screws or fingers.

A vibration module of a device according to the invention is capable of vibrating a said first cylindrical support comprising a central column with cylindrical lateral wall, preferably with a polygonal cross-section, around which and against which is rolled and fixed a chute comprising a helicoidal conduit, the whole weighing more than 10 t, preferably more than 15 t, and being capable of thermally processing a particular product, preferably pulverulent, with a rate of more than 15 t/h, preferably more than 20 t/h.

More particularly, said upper table is fixed to a lower end of said first support and said lower table comprises damping pins preferably made of elastomer material on the underside.

The present invention also provides a process for executing a vibrating helicoidal transport device according to the invention, characterised in that a succession of simultaneous actuations and stops of the assembly of said vibrating motors is made to generate said helicoidal vibrations of said transport module.

More particularly, in the process according to the invention, said motors are unbalance motors comprising an eccentric internal mass capable of turning in internal rotation about the axial longitudinal axis YY' of said motor, the two motors of the diametrically opposed different pairs turning in internal rotation in the opposite direction.

BRIEF DESCRIPTION OF SEVERAL VIEWS OF THE DRAWINGS

Other characteristics and advantages of the present invention will emerge from the following detailed description of two embodiments, given in conjunction with FIGS. 1 to 3, in which:

FIGS. 1 to 3 show a preferred variant embodiment of a vibration module 1b, comprising a said second support 4 of vertical axis XX', fitted with four unbalance motors 5.

DETAILED DESCRIPTION OF THE INVENTION

Figure 1:
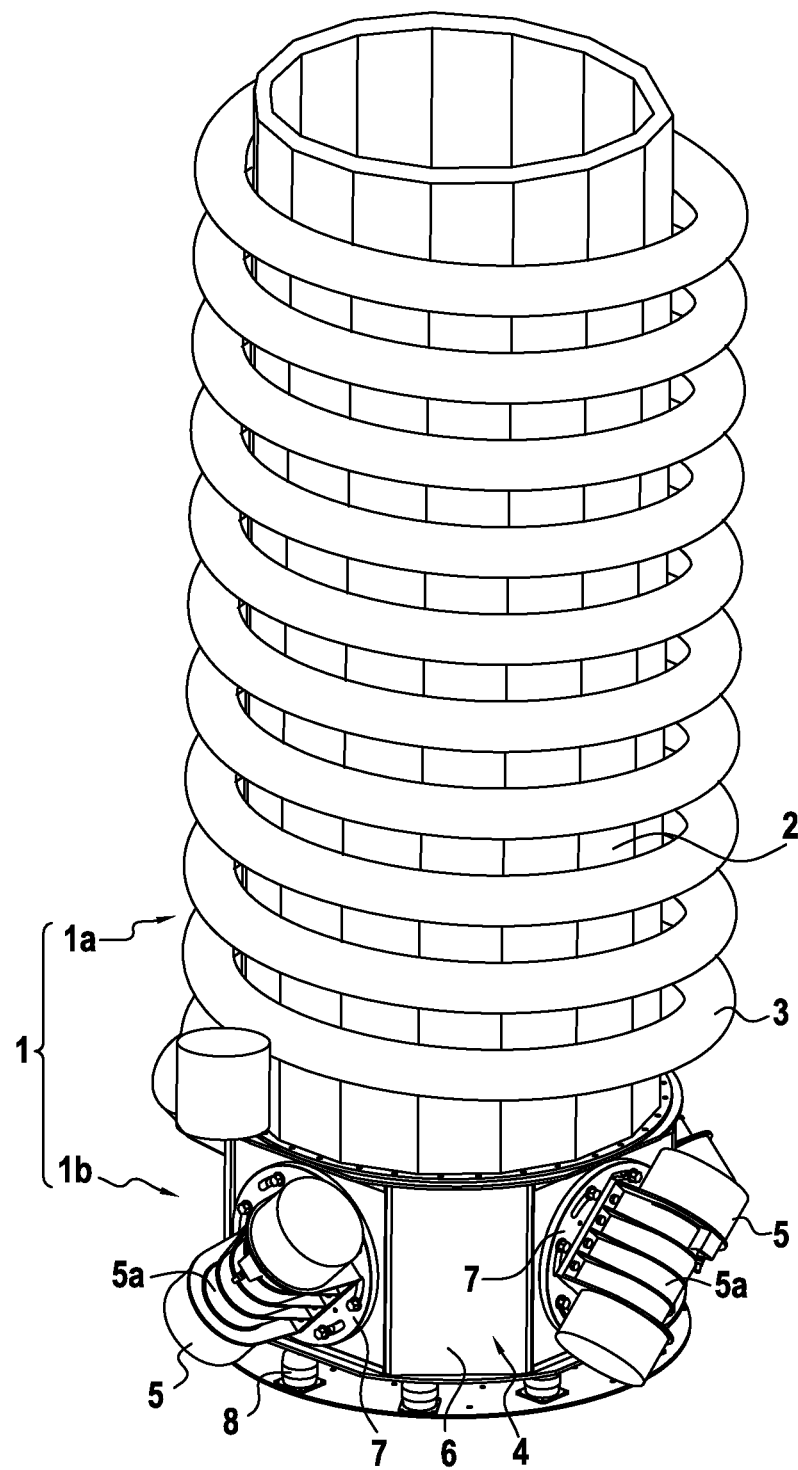
FIG. 1 illustrates a transport device vibrating 1 comprising a vibration module 1b fitted with four unbalance motors 5 and capable of vibrating a transport module 1a, comprising a cylindrical central column 2 of polygonal cross-section, supporting a chute or helicoidal conduit 3.
Figure 1A:
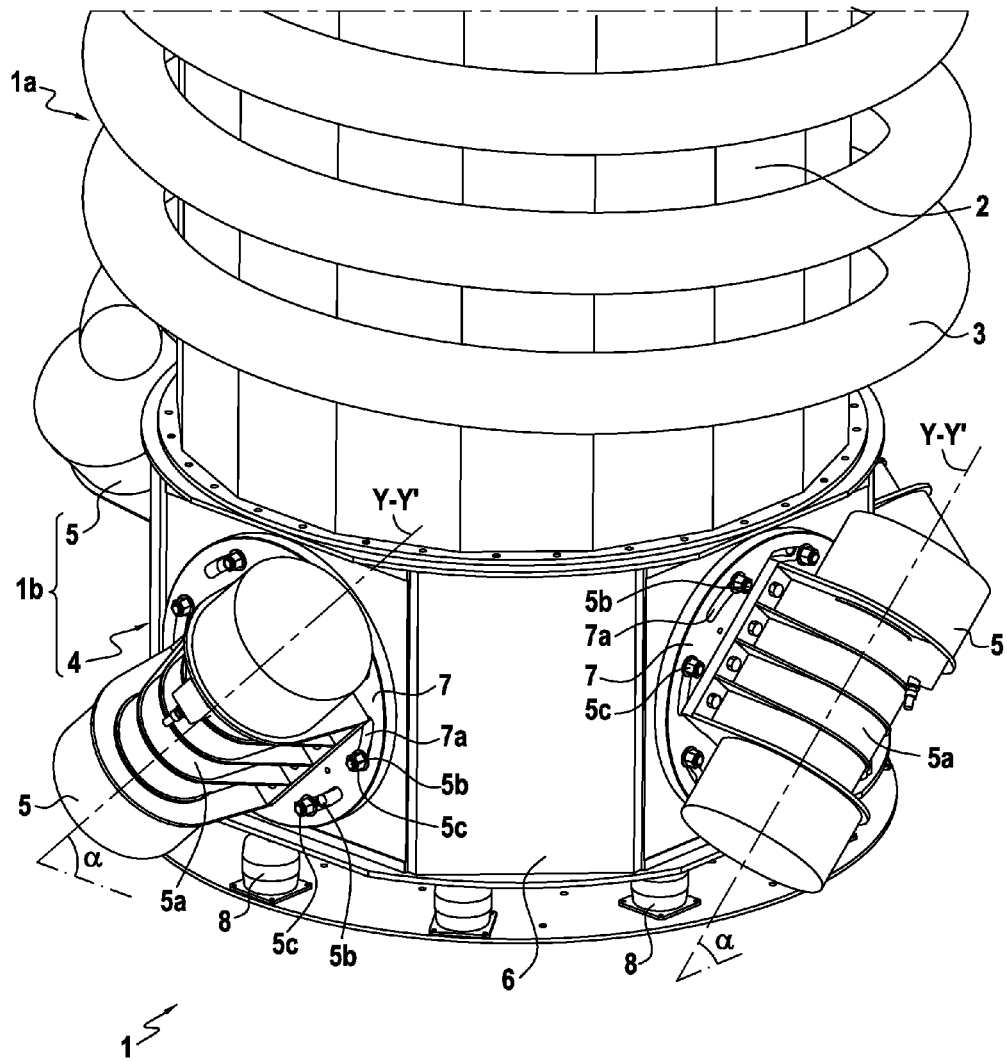
Figure 2:
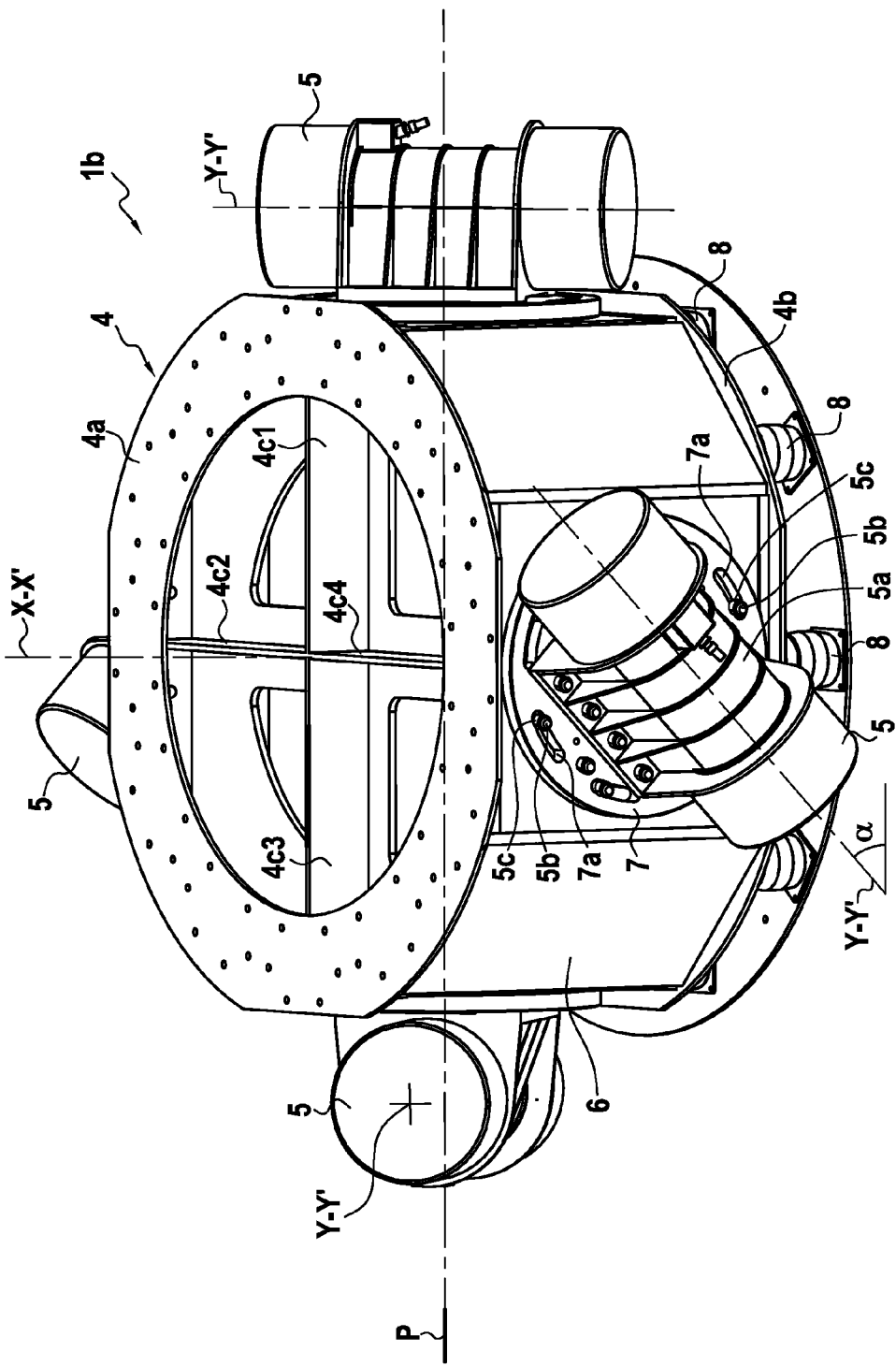
FIG. 2 illustrates a first variant embodiment of a rigid connecting piece and said second support 4, a vibration module 1b in perspective view.
Figure 2A:
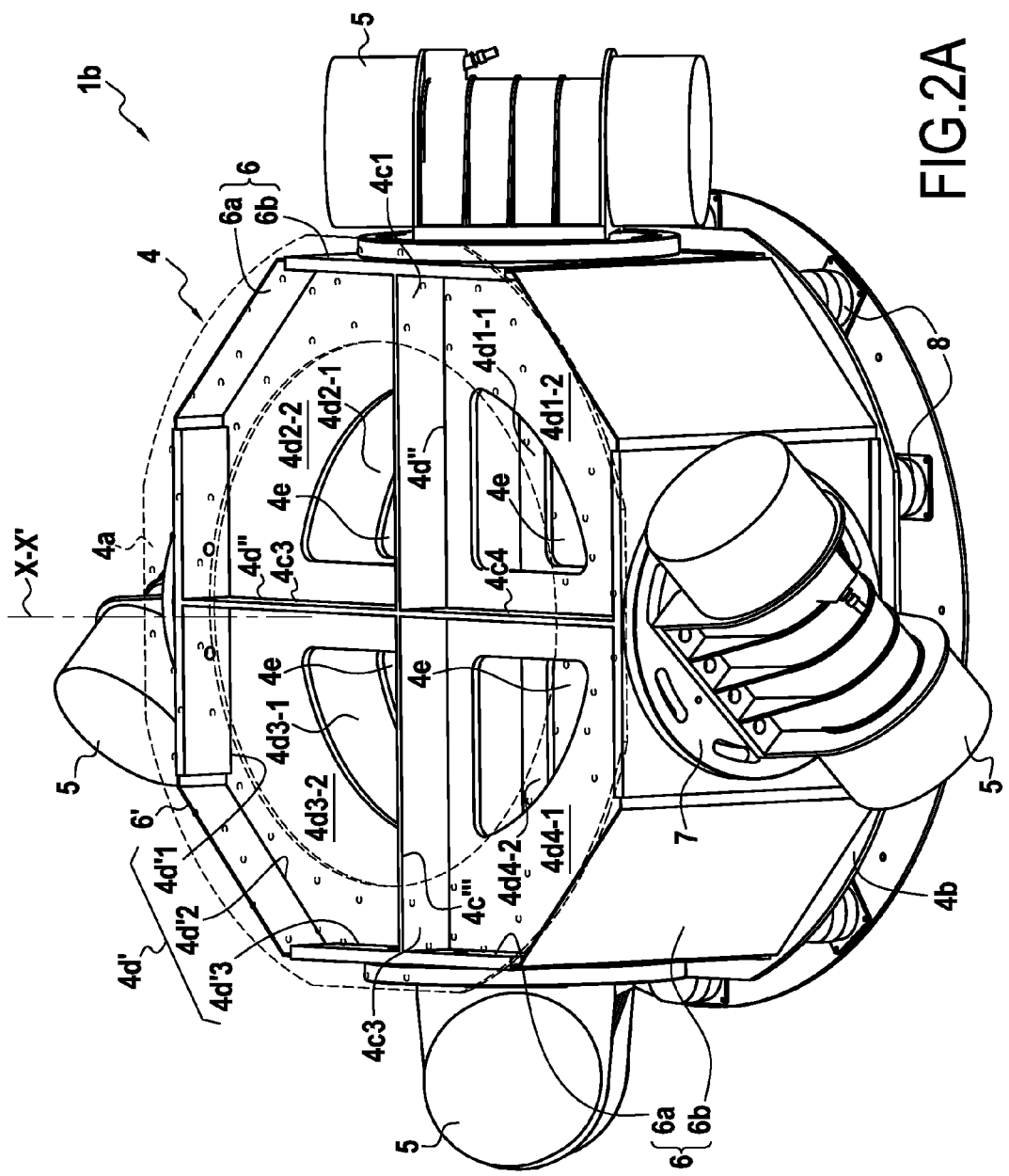
FIG. 2A is a perspective view of the vibration module 1b of FIG. 2, without the upper table 4a, FIG. 2B is a view of the vibration module 1b of FIG. 2, in vertical section at the level of a vertical structural element 4c4.
Figure 2B:
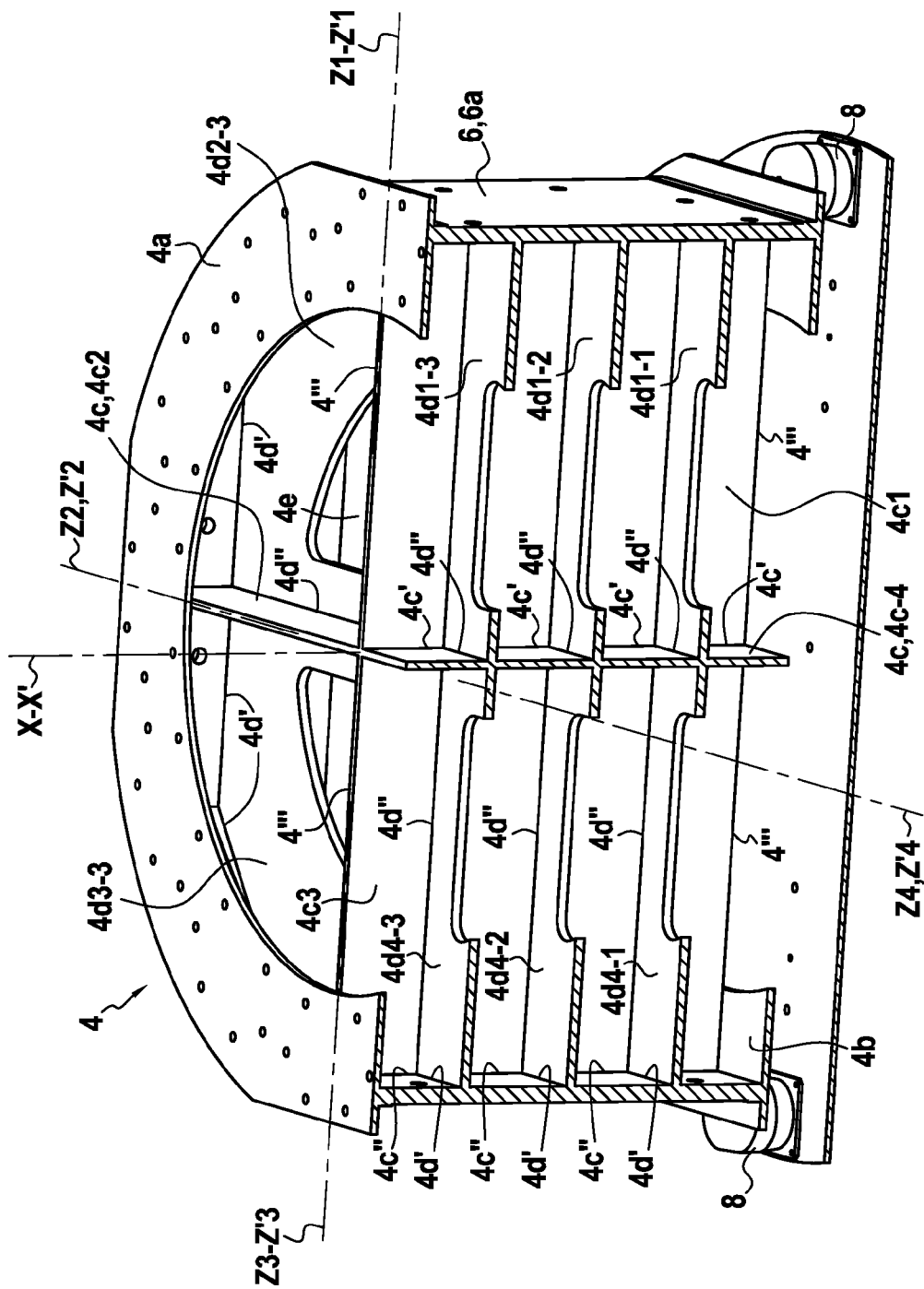
FIG. 2C is a view of a vibration module 1b of FIG. 2, in horizontal section between two levels, containing horizontal structural elements.
Figure 2C:
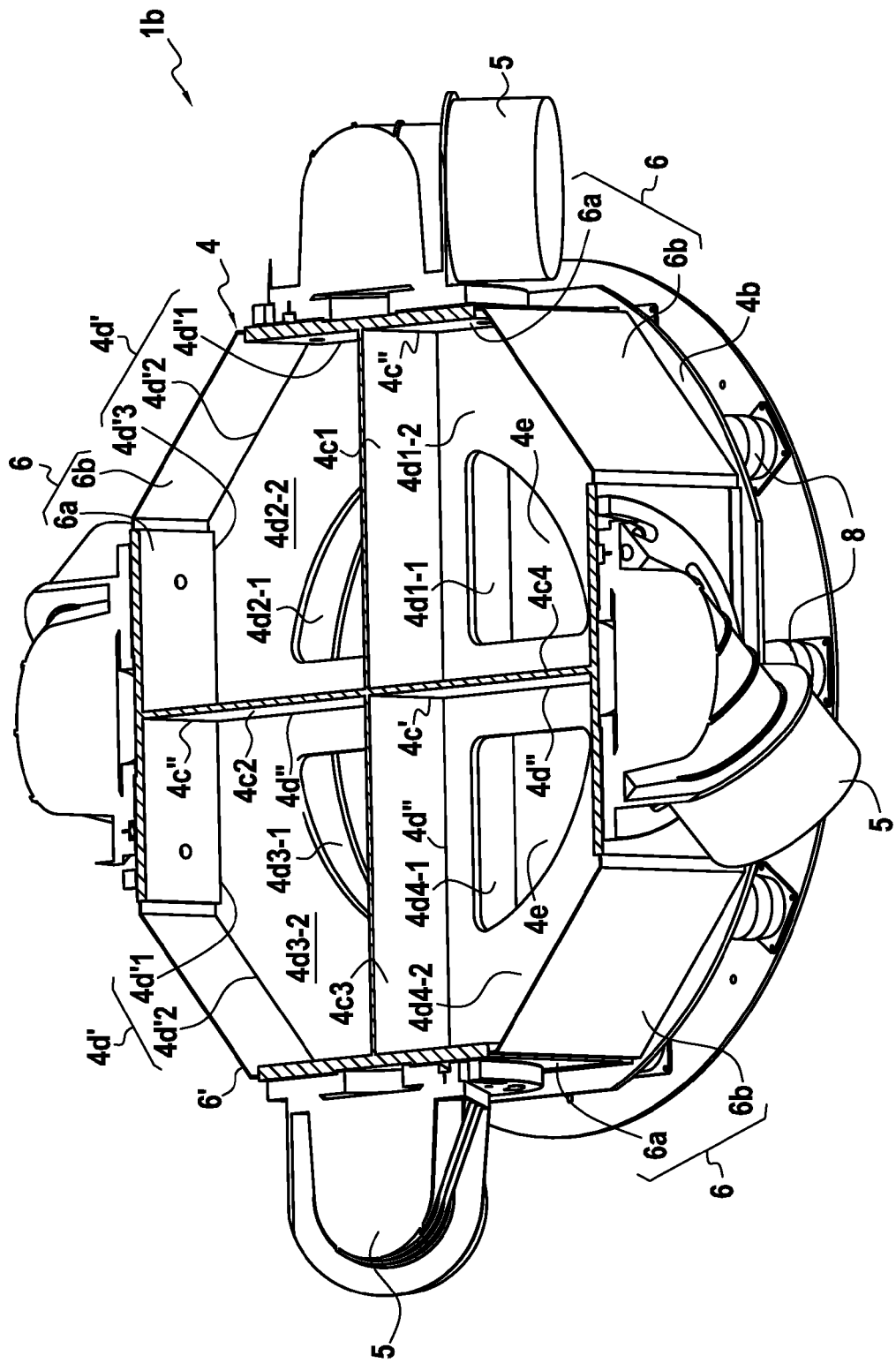

This vibration module 4 comprises a lower table 4b, of flat annular shape, supporting a rigid connecting piece comprising a structure mecano-welded, partly hollowed out or partly void, of the same vertical axis XX', comprising an assembly by welding four vertical structural elements 4c1, 4c2, 4c3, 4c4, constituted by plane sheets, arranged vertically and radially from the axis XX'. More precisely, two vertical structural elements 4c2 and 4c4 form the same plate extending continuously and symmetrically relative to the said central vertical axis XX' and having diametrically opposed external peripheral edges 4c". Two other vertical structural elements 4c1 and 4c3, arranged perpendicularly to a vertical axial connecting element 4c constituted here by the two vertical structural elements 4c2 and 4c4. These two elements 4c1 and 4c3 have internal edges 4c' welded onto respectively the two faces of said plate or vertical axial connecting element 4c, at the level of the vertical axis central XX'. Each vertical structural element 4c1 to 4c4 extends in a radial direction Z1Z'1, Z2Z'2, Z3Z'3 and respectively Z4Z'4, the four directions and the four elements 4c1 to 4c4 being arranged in a cross.

Above the elements 4c1 to 4c4 is welded a flat annular upper table 4a, of the same axis XX'. The upper table 4a rests on and is welded above the upper edges 6' of the panels 6a and 6b and upper edges 4c''' of the four vertical structural elements 4ci, with i=1 to 4.

Panels of metal sheeting 6a are arranged vertically, welded at the level of the peripheral external edges 4c" of each of said vertical structural elements 4c1 to 4c4, and perpendicularly to each of said vertical structural elements 4c1 to 4c4.

Said rigid connecting piece of the second support 4 also comprises horizontal structural elements 4di-j, with i=1 to 4 and j=1 to 3, twelve altogether (4d1-1, 4d1-2, 4d1-3, 4d2-1, 4d2-2, 4d2-3, 4d3-1, 4d3-2, 4d3-3, 4d4-1, 4d4-2, 4d4-3), constituted also by plane plates or sheets, perforated in the central part, 4e.

The twelve horizontal structural elements 4di-j, with i=1 to 4 and j=1 to 3 are arranged horizontally on three levels, distributed uniformly at the height of the vertical structural elements 4ci, with i=1 to 4, such that on each level there are four horizontal structural elements, each horizontal structural element being arranged and welded between and respectively against two successive vertical structural elements, that is, arranged at 90°. In this way, on the bottom layer, the four horizontal structural elements 4d1-1, 4d2-1, 4d3-1 and 4d4-1, are arranged and welded respectively in the following way:

the four elements 4d1-j, with j=1 to 3, arranged above each other, distributed uniformly over height, are arranged between the two vertical elements 4c4 and 4c1, and the three elements 4d2-j, with j=1 to 3, are arranged between the vertical elements 4c1 and 4c2, and the three elements 4d3-j, with j=1 to 3, are arranged between the vertical elements 4c2 and 4c3, and the three horizontal elements 4d4-j, with j=1 to 3, are arranged between the vertical elements 4c3 and 4c4.

Each horizontal structural element 4di-j comprises two internal edges lateral 4d''', extending radially and welded against two vertical plates 4ci over their entire length. Each horizontal structural element 4di-j occupies the whole space between two vertical structural elements 4ci arranged at 90°. As a consequence, the two lateral internal edges 4d''' of each horizontal structural element 4di-j are at 90°.

The contour of all four horizontal structural elements 4di-j, with i=1 to 4, for each of the levels j=1 to 3, forms in horizontal section an octagon also corresponding to the sectional form of the four panels 6a arranged against the external vertical edges 4c" of the four vertical structural elements 4ci, with i=1 to 4, and four plates 6b arranged against the peripheral external edges 4d' of the elements 4di-j interposed between the plates 6a.

On the other hand, the perimeter in horizontal section of the external edges 4d' and of the entire envelope wall 6 formed by the panels 6a and 6b has a form of a regular octagon, such that the peripheral external edge 4d' of each horizontal structural element 4di-j has three rectilinear cross-sections 4d'1, 4d'2 and 4d'3. The two cross-sections, at each end, 4d'1 and 4d'3, extending from the ends of each of the two vertical structural elements 4ci, between which is arranged and welded said horizontal structural element, are of the same length and arranged at 90°. And, the median cross-section 4d'2 joining the two ends of the two terminal cross-sections 4d'1 and 4d'3 is arranged at 135° relative to the terminal cross-sections. It is therefore understood that each terminal cross-section 4d'1 and 4d'3 extends over half of the width of a vertical plate 6a supporting a motor 5. The median cross-section 4d'2 has a length double the terminal cross-sections 4d'1 and 4d'3.

Located in a central part of each of the horizontal structural elements 4ci-j, with i=1 to 4 and j=1 to 3, is a perforation 4e. The perforations 4e of the three superposed elements 4ci-j are arranged opposite relative to each other on each of the three levels, aligned vertically such that a ladder can be arranged inside the vibration module 1b to allow maintenance personnel to intervene when needed inside the vibration module 1b.

The vertical structural elements 4c1 to 4c4, as well as the plates 6a and 6b of the envelope wall 6, rest on a flat lower annular bracket 4b of the same axis XX'.

Arranged on the underside of the lower bracket 4b are damping pins made of elastomer material 8.

Said unbalance motors 5 comprise cylindrical hoods fixed to first plates of fixation 7, circular in shape, in turn fixed against the lateral walls 6a. Each of the lateral walls 6a supports a said first mounting plate 7 and a said motor 5. The hood of the motor 5 is fixed against the first plate 7 by means of a flange 5a, enclosing each hood and comprising a second plate 5b, connected by screws and nuts 5c of the first mounting plate 7. The first four plates of fixation 7 are arranged at the same height, symmetrically and perpendicularly each relative to a vertical structural element 4ci, with i=1 to 4. Said first plates of fixation 7 comprise holes 7a, curved circularly and uniformly spaced from each other so they can move, in rotation on themselves, said first plates of fixation 7 due to the fact that fastening screws or fingers 7b connected to the wall 6a pass through said orifices 7a and connect and fixer said first plates of fixation 7 in a given position of rotation by way of nuts 7c.

The four motors 5 comprise cylindrical hoods extending in longitudinal axial directions YY' according to the same inclination $\alpha$ a relative to the horizontal by an angle of inclination of the same value and in the same direction of rotation in two planes parallel to the said first axis arranged at the same distance from said first axe. Each said motor is fixed at the level of its hood to said lateral wall by means of a first mounting plate 7 solid with said lateral wall 6. Said first plate 7 can adopt several fastening positions by rotation on itself of said first bracket around the same radial horizontal axis so as to allow said variable inclination $\alpha$ of said axis longitudinal of said motor 5.

The inclination of the angle $\alpha$ relative to the horizontal (P) has a value $\alpha=30$ to $60°$, preferably $\alpha=45°$.

Each said motor comprises an eccentric internal mass capable of turning in internal rotation about the longitudinal axial axis YY' of said motor.

The eccentric internal mass, in rotation inside said hood, generates multidirectional vibrations in a plane at a right angle to the axis YY' of the hood, vibrations whereof the frequencies are determined by the speed of rotation and whereof the amplitudes are proportional to the weight of said mass. The motor coupled to the vibration module 4 transmits its vibrations to the said module.

The motors used have a centrifugal force of 180,000 N and a working moment of 6,000 kg·cm. A motor of this type, having a frequency of 740 rpm (12.5 Hz), comprises 8 poles (4 pairs of poles) and sold by the company FRIEDRICH SCHWINGTECHNIK GmbH under the reference F6000-8-10.0. The two motors diametrically opposed by the two pairs of motors turn in internal rotation in the opposite direction so that when a succession of simultaneous actuations and stoppages of the assembly of said vibrating motors is made, this generates helicoidal vibrations of said vibration module at the level of its upper table $4a$.

Figure 3:
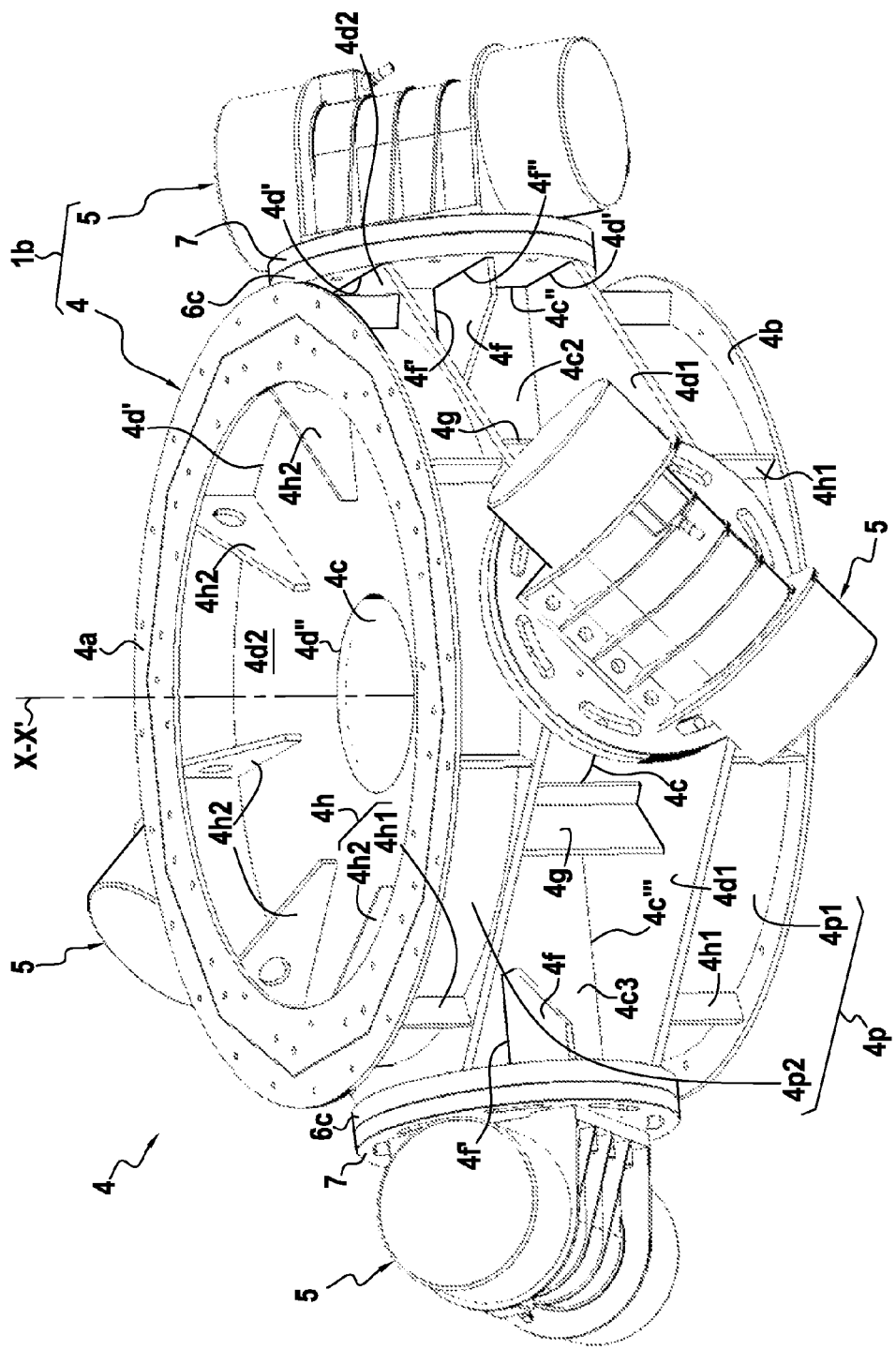
FIG. 3 is a perspective view of a second embodiment of a rigid connecting piece and said second support 4 of a vibration module 1b.

FIG. 3 illustrates a second variant embodiment of a vibration module 4, whereof said rigid connecting piece comprises an axial connecting element $4c$ which is a vertical tubular connecting element. Said rigid connecting piece comprises four vertical structural elements $4ci$, with i=1 to 4, constituted by plates or flat vertical metal sheets arranged radially, a vertical internal edge $4c'$ of which is welded on the external face of the vertical tube $4c$. The four vertical structural elements $4ci$, with i=1 to 4, are arranged in a cross about said vertical central tube $4c$. The vertical external edges $4c''$ of the elements $4c1$ to $4c4$ support panels of peripheral envelope wall 6 (not shown) or circular flanges $6c$ arranged vertically and perpendicularly to the said vertical structural elements $4ci$. Each flange $6c$ directly supports a said unbalance motor 5 or a said first mounting plate 7, on the external face of which is fixed a said unbalance motor 5. Said flanges $6c$ or the panels of peripheral walls 6 (not shown) are also supported by two horizontal structural elements $4d1$, $4d2$, arranged and welded as follows. The two horizontal structural elements $4d1$ and $4d2$ each comprise a flat horizontal sheet extending from the external face of the vertical tube $4c$ over its entire circumference as far as their peripheral contour delimiting an octagon. Four rectilinear cross-sections of said octagon form the parts of the horizontal peripheral external edges $4d'$ welded on the internal face of said flanges $6c$. A first lower horizontal structural element $4d1$ extends from the lower end of the central connecting tube $4c$ to a said flange $6c$, and a second upper horizontal structural element $4d2$ extends from the upper end of said central connecting tube $4c$ to a said flange $6c$.

The first lower horizontal structural element $4d1$ is welded on the lower edges $4c'''$ of the four vertical structural elements $4c1$ to $4c4$ and the second horizontal upper connecting element $4d2$ is welded on the edges upper $4c'''$ of the four vertical structural elements $4c1$ to $4c4$.

Horizontal reinforcing elements each comprise two ailerons $4f$ arranged and welded against the two opposite faces of each said vertical structural element $4c1$ to $4c4$. Each aileron $4f$ comprises a horizontal radial lateral internal edge $4f'$, extending from the peripheral vertical external edge $4c''$ of said vertical structural element $4ci$, and an external peripheral edge $4f'''$ extending perpendicularly to the said vertical external peripheral edge $4c''$ and welded on a face of a said flange $6c$. Each aileron $4f$ is located substantially at mid-height of said vertical structural element $4ci$. In this way, each of the four flanges $6c$ is supported by two ailerons $4f$ arranged on either side of the vertical structural element $4ci$ supporting said flange and the two horizontal structural lower $4d1$ and upper $4d2$ elements.

The two horizontal structural elements $4d1$ and $4d2$ are also connected by vertical reinforcing elements $4g$ arranged between two consecutive vertical structural elements $4ci$, arranged at 90°. The four vertical reinforcing elements $4g$ are constituted by profiles of cross-transversal section, open, in a T shape.

Said rigid mecanowelded piece also comprises two tubular connecting elements $4p$, arranged respectively below the first lower horizontal connecting element $4d1$ and above the second horizontal connecting element $4d2$, the two portions of tube $4p$ being arranged according to the same axis XX' as said tube central $4c$. The first lower tubular connecting element $4p1$ ensures bonding by welding of the lower face of the first horizontal structural element $4d1$ and of the upper face of an annular lower table plate $4b$. And, the second tubular connecting element $4p2$ ensures bonding by welding of the upper face of the second horizontal structural element $4d2$ and the lower face of a upper table annular $4a$, said tables, lower $4b$ and upper $4a$, annular, being of the same axis XX'. Vertical reinforcing elements $4h$, arranged radially, complete rigidification of the bond between both the lower horizontal structural element $4d1$ and the lower table $4b$ and between the upper horizontal structural element $4d2$ and the upper table $4a$. Of the complementary vertical reinforcing elements $4h$ arranged radially, reinforcing elements external $4h1$ are distinguished, welded and bearing a vertical internal edge welded on the external face of said tubular connecting elements $4p1$ and $4p2$, and internal vertical reinforcing elements $4h2$, welded onto the face internal of said tubular connecting elements $4p1$ and $4p2$.

The two vibration modules 4 of the two embodiments specified hereinabove can support four unbalance motors such as described previously, all inclined at the same angle α relative to a horizontal plane and all inclined in the same direction of rotation, with two motors diametrically opposite each pair of motors 5 turning in internal rotation in the opposite direction. These motors 5 are sold by the company FRIEDRICH SCHWINGTECHNIK GmbH and have the characteristics described hereinabove. In this way, it is possible to vibrate a column 2 supporting a helicoidal conduit 3 of a vibrating helicoidal transport device 1 for processing up to 20 t/h of particles and capable of reaching displacement speeds of 50 cm/s in a helicoidal conduit of 10 to 18" in diameter (273 mm to environ 491 mm). The entire central column 2 and of the pipe 3 can weigh over 15 t for a column of 3 m in diameter and a pipe height of 17 m extending over 17 turns, not possible to achieve with vibration modules fitted with only two unbalance motors.

The invention claimed is:

1. A vibrating transport device (1) comprising:
   a transport module (1a) comprising a first cylindrical support (2) extending in a first axis in a vertical longitudinal direction (XX'), said first cylindrical support supporting a helicoidal chute or conduit (3) of the same first axis (XX'), and
   a vibration module (1b) comprising a second support (4) of the same first axis (XX'), comprising two upper and lower tables (4a, 4b), whereof one vibration transfer table, at least, fixed to a longitudinal end of said first cylindrical support so as to enable it to transfer said vibrations, said second support supporting at least n pairs of vibrating motors (5) distributed uniformly over the lateral periphery of said second support according to a same horizontal plane (P), preferably a median horizontal plane (P), more preferably over a peripheral lateral wall (6) of said second support, each motor extending in a longitudinal direction (YiYi' with i=1 to 2n) according to the same inclination α relative to the horizontal, the two motors of each pair being arranged diametrically opposed, said second support comprising a rigid connecting piece between the different vibrating motors and said vibration transfer table such that simultaneous actuation in vibration of the assembly of said motors is capable of generating helicoidal vibration of the first support, characterised in that said rigid connecting piece is a structure mecano-welded, partly hollowed out, of the same vertical axis XX' comprising, at least, an assembly by welding of at least:
a) a plurality of at least 2n structural elements extending in a vertical direction, so-called vertical structural elements ($4ci$ with i=1 to 2n), comprising external edges ($4c'$) diametrically opposed in pairs, said vertical structural elements comprising flat parts extending in different radial directions $ZjZj'$, with j=1 to n, each said vertical structural element having transversal cross-sections open in horizontal cross-sections and vertical cross-sections perpendicular to said radial direction, and
b) a plurality of at least 2n structural elements extending in a horizontal direction so-called horizontal structural elements ($4dj$, $4di$-$j$, with i=1 to 4, j=1 to p with p=2 or 3) comprising external peripheral edges ($4d'$) diametrically opposed in pairs, said horizontal structural elements comprising flat parts being located at different levels in the vertical direction (XX'), each said horizontal structural element having transversal cross-sections open in vertical cross-sections, and
c) each said vertical structural element ($4ci$) being welded to at least one said horizontal structural element ($4dj$, $4di$-$j$, with i=1 to 4, j=1 to p with p=2 or 3) and each said horizontal structural element being welded to at least one said vertical structural element, at least 2(n−1) of said vertical structural elements diametrically opposed in pairs ($4c1$, $4c3$) comprising internal edges ($4c'$) welded to a same vertical connecting element, and at least one part of said horizontal structural elements comprising internal edges ($4d''$) welded to the same vertical axial connecting element ($4c$), and
d) each said vibrating motor (5) being fixed, preferably by means of a first mounting plate or first flange (7),
either to at least one said peripheral external edge ($4c''$) of at least one said vertical structural element ($4ci$, with i=1 to 4) and to at least one said peripheral external edge ($4d'$) of at least one said horizontal structural element,
or, preferably, to part of a lateral wall (6) welded to at least one said peripheral external edge ($4c''$) of at least one said vertical structural element ($4ci$) and welded to at least one said peripheral external edge ($4d'$) of at least one said horizontal structural element ($4dj$, $4di$-$j$).

2. The device according to claim 1, characterised in that all said vertical structural elements comprise internal edges ($4c'$) welded to the same vertical connecting element axial ($4c$).

3. The device according to claim 1, characterised in that said rigid connecting piece comprises:
entirely flat said vertical structural elements ($4ci$), and
entirely flat said horizontal structural elements ($4di$, $4di$-$j$, $4e$, $4e$-$j$).

4. The device according to claim 1, characterised in that said axial connecting element ($4c$) is a vertical tubular connecting element of the same vertical axis (XX'), preferably all said vertical structural elements ($4ci$) being welded to a tubular said same vertical connecting element.

5. The device according to claim 1, characterised in that two said vertical structural elements ($4c2$, $4c4$) having diametrically opposed peripheral edges are constituted by the same piece having a vertical central flat part extending continuously and symmetrically relative to the said vertical central axis (XX') and forming a said vertical axial connecting element ($4c$), and the other vertical structural elements ($4c1$, $4c3$) have internal edges ($4c'$) welded onto a face of said flat central part of said axial connecting element.

6. The device according to claim 1, characterised in that said rigid connecting piece comprises:
said entirely flat vertical structural elements ($4ci$), extending vertically between said upper ($4a$) and lower ($4b$) tables and radially from substantially said vertical axis XX' and the periphery of said module, and
said entirely flat horizontal structural elements ($4di$-$j$) comprising two lateral edges extending radially forming said internal edges ($4d''$) welded to said vertical structural elements ($4ci$), each said flat vertical structural element being welded to a plurality of said flat horizontal structural elements at different levels (p) in the vertical direction.

7. The device according to claim 5, characterised in that at each of the p levels in the vertical direction, 2n said flat horizontal structural elements ($4di$-$j$, with i=1 to 2n, n=2 and j=1 to 3) are located at the same level in the vertical direction.

8. The device according to claim 1, characterised in that said rigid connecting piece comprises said horizontal structural elements at p levels in the vertical direction comprising flat parts having perforations ($4e$) aligned vertically in which is placed an inspection ladder or is capable of enabling an inspection ladder to be placed therein, with preferably p=2 to 5.

9. The device according to claim 1, characterised in that said rigid connecting piece comprises:
vertical reinforcing elements ($4g$, $4h$) constituted preferably of profiles with open transversal cross-sections, extending between two said upper and lower tables ($4a$, $4b$) or between two flat parts of two said horizontal structural elements, and/or
horizontal reinforcing elements ($4f$), whereof a radial internal edge is welded to a flat part of a said vertical structural element from its peripheral external edge ($4c''$), preferably two said horizontal reinforcing elements being welded onto the two opposite faces of said flat part.

10. The device according to claim 1, characterised in that said pairs of motors number n=2 to 6, and the different radial directions ($ZjZj'$) of the different pairs of motors in said median plane being spaced angularly by the same beta angle of 90° (n=2), 60° (n=3), 45° (n=4), 36° (n=5), 30° (n=6).

11. The device according to claim 1, characterised in that said vibrating motors (5) are unbalance motors actuatable electrically in vibration, and said motors comprise cylindrical hoods extending in longitudinal axial directions (YY') according to an inclination by an angle α of the same value and in the same direction of rotation in planes parallel to the said first axis XX' arranged at the same distance from said first axis, each said motor comprising an eccentric internal mass capable of turning in internal rotation about the longitudinal axial axis YY' of said motor, each said motor being fixed at the level of its hood to said lateral wall by means of a first mounting plate or first flange (7) solid with said lateral wall (6) or a second plate or second flange ($6c$), said first mounting plate or first flange (7) being fixed to a flange or collar ($5a$) solid with said hood, said first plate or first flange (7) being fixed against said lateral wall (6) or said second plate or second flange ($6c$), said first plate or first flange (7) capable of adopting several fastening positions by rotation of said first plate or first flange about the same radial axis so as to enable said variable α inclination of said longitudinal axis of said motor (5).

12. The device according to claim 11, characterised in that said first plate or first flange (7) comprises orifices ($7a$) each extending over a portion of an arc of a circle, preferably of the same length, the different orifices being spaced along the same circle, preferably uniformly spaced, of fastening screws or fingers (7*b*) connected to said lateral wall (6) or said second plate or second flange (6*c*) passing through said orifices (7*a*), the position of said first plate or first flange being adjustable in rotation relative to said lateral wall (6) or said second plate or second flange (6*c*) according to any position along each orifice and by offset of the orifices (7*a*) passing through said screws or fingers (7*b*).

13. The device according to claim 1, characterised in that said upper table is fixed to a lower end of said first support and said lower table comprises damping pins (8) preferably made of elastomer material on the underside.

14. A process for executing a device according to claim 1, characterised in that a succession of simultaneous actuations and stoppages of the assembly of said vibrating motors is carried out to generate said helicoidal vibrations of said transport module.

15. The process according to claim 14, characterised in that said motors are unbalance motors (5) comprising an eccentric internal mass capable of turning in internal rotation about the longitudinal axial axis YY' of said motor, the two motors of the different diametrically opposed pairs turning in internal rotation in the opposite direction.

* * * * *